United States Patent
Hafermalz et al.

(10) Patent No.: US 11,325,639 B2
(45) Date of Patent: May 10, 2022

(54) STEERING GEAR

(71) Applicant: Robert Bosch Automotive Steering GmbH, Schwäbisch Gmünd (DE)

(72) Inventors: Jens-Uwe Hafermalz, Waeschenbeuren (DE); Ekkehard Kneer, Wendlingen (DE)

(73) Assignees: Robert Bosch Automotive Steering GmbH, Schwäbisch Gmünd (DE); Robert Bosch GmbH, Stuttgart (DE)

( * ) Notice: Subject to any disclaimer, the term of this patent is extended or adjusted under 35 U.S.C. 154(b) by 913 days.

(21) Appl. No.: 16/071,481

(22) PCT Filed: Jan. 25, 2017

(86) PCT No.: PCT/EP2017/051538
§ 371 (c)(1),
(2) Date: Jul. 19, 2018

(87) PCT Pub. No.: WO2017/153083
PCT Pub. Date: Sep. 14, 2017

(65) Prior Publication Data
US 2021/0086818 A1    Mar. 25, 2021

(30) Foreign Application Priority Data
Mar. 8, 2016  (DE) ............... 10 2016 104 150.5

(51) Int. Cl.
*F16H 35/00* (2006.01)
*B62D 3/10* (2006.01)
(Continued)

(52) U.S. Cl.
CPC ............... *B62D 3/10* (2013.01); *F16C 25/06* (2013.01); *F16H 1/16* (2013.01); *F16H 57/021* (2013.01);
(Continued)

(58) Field of Classification Search
CPC ............ F16H 2057/0213; F16H 55/24; F16H 57/022; F16H 2057/0222; F16H 2057/127; F16C 2380/27; F16C 2361/61
See application file for complete search history.

(56) References Cited

U.S. PATENT DOCUMENTS

2001/0040067 A1* 11/2001 Murakami ............ F16F 1/3828
180/444
2009/0255751 A1   10/2009 Kondo et al.
(Continued)

FOREIGN PATENT DOCUMENTS

DE    10 2009 054 655 A1    6/2011
DE    10 2012 103 146 A1    10/2013
(Continued)

OTHER PUBLICATIONS

International Search Report corresponding to PCT Application No. PCT/EP2017/051538, dated Mar. 30, 2017 (German and English language document) (5 pages).

*Primary Examiner* — Jake Cook
(74) *Attorney, Agent, or Firm* — Maginot, Moore & Beck LLP

(57) ABSTRACT

A steering gear includes a gear wheel, a screw pinion meshing therewith, and a screw pinion shaft that includes the screw pinion. The screw pinion shaft is mounted on one side of the screw pinion in a fixed bearing. The steering gear includes a rotary bearing which comprises an inner bearing shell and an outer bearing shell. The outer bearing shell is connected to an inner ring of a swivel ring. The inner ring is connected to an outer ring of the swivel ring by a torsion web so as to pivot about a pivot axis. The torsion web runs at a distance from a supporting surface. The distance is dimensioned such that the torsion web does not contact the supporting surface when the screw pinion shaft is not loaded
(Continued)

with a torque, and partially contacts the same when the screw pinion shaft is loaded with an operating torque.

9 Claims, 3 Drawing Sheets

(51) Int. Cl.
    *F16C 25/06*     (2006.01)
    *F16H 1/16*     (2006.01)
    *F16H 57/021*     (2012.01)
    *F16H 57/039*     (2012.01)
    *F16H 57/12*     (2006.01)

(52) U.S. Cl.
    CPC ........ *F16H 57/039* (2013.01); *F16C 2361/61* (2013.01); *F16H 2057/0213* (2013.01); *F16H 2057/127* (2013.01)

(56) References Cited

U.S. PATENT DOCUMENTS

| | | | | |
|---|---|---|---|---|
| 2012/0272765 A1* | 11/2012 | Fuechsel | ................. | F16C 23/06 |
| | | | | 74/416 |
| 2015/0040699 A1* | 2/2015 | Hafermalz | ............... | B62D 3/02 |
| | | | | 74/89.16 |
| 2016/0097424 A1* | 4/2016 | Hafermalz | ........... | B62D 5/0409 |
| | | | | 74/425 |

FOREIGN PATENT DOCUMENTS

| | | |
|---|---|---|
| DE | 10 2013 104 521 A1 | 11/2014 |
| WO | 2011/073089 A1 | 6/2011 |

\* cited by examiner

STEERING GEAR

This application is a 35 U.S.C. § 371 National Stage Application of PCT/EP2017/051538, filed on Jan. 25, 2017, which claims the benefit of priority to Serial No. DE 10 2016 104 150.5, filed on Mar. 8, 2016 in Germany, the disclosures of which are incorporated herein by reference in their entirety.

The disclosure relates to a steering gear for a power-assisted steering system of a motor vehicle.

The power-assisted steering systems incorporated in most motor vehicles generate an auxiliary torque during steering and thus reduce the steering torque to be applied to the steering column by the driver.

The known power-assisted steering systems are based on a steering gear which transmits the drive power of a hydraulic or electric drive and transfers it, for example, to the steering column. Such steering gears are generally designed in the form of a screw rolling gear and in particular as a helical gear or worm gear, i.e. these comprise a gear wheel, which is connected directly or indirectly to the steering rod, and a pinion which meshes therewith and is driven by the drive via a shaft.

In steering gears of this type, the gear play which develops due to component tolerances, different thermal expansions of the gear elements, wear and a reduction in material in the case of gear wheels made from plastics materials has proven problematic. In particular, in the case of a so-called alternating steering, i.e. in the case of steering in which the steering angle direction alternates in direct succession, such a gear play generates undesired noises which result from the alternating abutting of opposing flanks of the teeth of the pinion and gear wheel.

It is known to eliminate this gear play in that the pinion shaft is mounted such that it is able to swivel about an axis which extends perpendicularly to the longitudinal axis of the pinion shaft and at a spacing from the gearing engagement of the pinion and gear wheel and is pressed against the gear wheel by means of one or more spring elements (so-called spring-loading of the pinion shaft). In this case, the swivel-mounting of the pinion shaft is generally integrated in one of the two bearings via which the pinion shaft is mounted at one end. This bearing is referred to as a "fixed bearing". The mounting in the region of the other end is then realized with play (so-called "floating bearing") in order to enable the deflection brought about by the swivel movement. The fixed bearing is generally provided on the drive side, whilst the floating bearing is provided at the free end of the pinion shaft. In this case, the spring element(s) for pressing the pinion against the gear wheel can be integrated both in the floating bearing and in the fixed bearing.

Such a steering gear, in which the spring force for the spring-loading is generated by means of the fixed bearing, is known for example from WO 2011/073089 A1. In this, it is provided that the rolling bearing, which receives the pinion shaft in the region of the fixed bearing, is mounted externally in a swivel sleeve. The swivel sleeve comprises a bearing sleeve, which receives the rolling bearing substantially without play, and an outer ring, which is held in a receiving means of a housing of the steering gear substantially without play, wherein the outer ring and the bearing sleeve are connected via a plurality of torsion webs which are twisted upon a rotation of the outer ring with respect to the bearing sleeve. After the assembly of the steering gear, the torsion webs are twisted in such a way that the elastic restoring effect generated thereby produces the spring-loading of the pinion shaft.

A design of a steering gear which is similar to that of WO 2011/073089 A1 is described in DE 10 2012 103 146 A1. In this, however, the swivel ring is constructed as a separate component. In this case, the swivel ring comprises an inner ring and an outer ring connected to the inner ring via two torsion webs. The outer ring serves for mounting the fixed bearing in the housing of the steering gear, whilst the inner ring is braced between the rolling bearing and a radially inwardly bent end of the bearing sleeve.

To ensure a sufficiently high spring-loading, i.e. a spring-loading which sufficiently eliminates unwanted noise development resulting from gear play, in spite of wear and in spite of a material reduction over the whole of the intended useful life of the steering gear, the spring-loading rate has to be relatively high for the new state of the steering gear whilst taking into account the possible component tolerances. However, this results in a correspondingly high friction in the steering gear in the new or barely worn state, which in turn essentially results in a tendency towards a poor steering feel. The configuration of the spring-loading of the pinion shaft is therefore generally a compromise which, on the one hand, is based on an advantageous noise development over the whole of the intended useful life and, on the other, on a good steering feel resulting from relatively low friction in the steering gear, in particular in the new state of the steering gear.

High friction in the steering gear moreover has a negative effect on the efficiency of the steering gear.

Starting with this prior art, the disclosure is based on the object of providing an improved steering gear for a power-assisted steering system of a motor vehicle. In particular, a steering gear should be provided, in which, in a structurally simple manner, it is possible to achieve as good a steering feel as possible with sufficiently low noise development over the useful life.

This object is achieved by a steering gear according to the disclosure. Advantageous embodiments of this are the subject matter of the dependent claims and are revealed in the following description of the disclosure.

The object is based on the idea of configuring the rigidity of the spring-loading of a pinion shaft of the steering gear, which is formed as a screw pinion shaft, to be variable so that, on the one hand, a sufficiently high spring-loading can be realized, by means of which gear play can be effectively eliminated and an advantageous noise behavior can therefore be achieved over the whole of the intended useful life of the steering gear, whilst, on the other, the spring-loading and therefore the friction in the gear is kept relatively low when this is advantageous for obtaining a good steering feel. This should make use of the fact that, for assessing the steering feel, the steering feel in the traveling state of a vehicle comprising the steering gear is particularly relevant whilst, in the case of alternating steering, a disadvantageous noise development can occur in particular in the stationary state and/or when driving slowly, for example up to a maximum of 20 km/h. If it is taken into account that the auxiliary powers which have to be generated by a power-assisted steering system and therefore by the drive connected to the steering gear are considerably higher in the stationary state and when driving slowly than in the traveling state of the motor vehicle, it is possible to make use of these different auxiliary powers transmitted via the steering gear to realize the variability of the spring-loading.

Therefore, a steering gear is provided, which has at least one gear wheel, a screw pinion meshing therewith and a screw pinion shaft comprising the screw pinion, wherein the screw pinion shaft is mounted in a fixed bearing on one side of the screw pinion, which fixed bearing comprises a pivot bearing, which an inner bearing shell, in which the screw pinion shaft is received, and an outer bearing shell, which is connected directly or indirectly to an inner ring of a swivel ring, wherein the inner ring is connected to an outer ring of the swivel ring via at least one torsion web such that it is able to swivel about a swivel axis lying transversely to the longitudinal direction (progression along the longitudinal axis) of the screw pinion shaft and wherein the outer ring is mounted directly or indirectly in a housing of the steering gear (and in this case is, in particular, also supported relative to the longitudinal direction of the screw pinion shaft). According to the disclosure, such a steering gear is characterized in that the torsion web extends at a spacing from a supporting surface on at least one side relative to the longitudinal direction of the screw pinion shaft, wherein this spacing is dimensioned in such a way that the torsion web does not contact the supporting surface when the screw pinion shaft is not loaded by a torque and at least partially contacts the supporting surface when the screw pinion shaft is loaded by an operating torque, i.e. a torque provided during the intended operation of the steering gear. In this case, it can preferably be provided that the torsion web contacts the supporting surface completely when the screw pinion shaft is loaded by the highest operating torque provided during operation.

Owing to the embodiment of the pinion as a screw pinion, the torque exerted on the screw pinion shaft produces a load in the longitudinal direction of the screw pinion shaft, which is transmitted to the housing via the swivel ring, wherein the torsion web of the swivel ring deforms in the corresponding direction owing to its elastic configuration, whereby it abuts at least partially against the supporting surface. The free length of the torsion web, i.e. the distance between the clamping of the outer ring and the inner ring of the swivel ring in the region of the torsion web, is thus functionally reduced, which results in a greater twisting and therefore in an increase in the spring-loading whilst the swivel angle at which the screw pinion shaft is deflected to achieve the spring-loading remains constant. As a result, a relatively strong spring-loading can therefore be achieved when the screw pinion shaft is loaded by a high torque, which is the case in particular when a steering movement is executed in the stationary state and when the motor vehicle is being driven slowly, whilst a relatively weak spring-loading with a correspondingly low friction and therefore a correspondingly advantageous steering feel is realized when the torque exerted on the screw pinion shaft is relatively low (or zero), as is the case in particular when a steering movement is executed in the traveling state of the motor vehicle.

In a preferred embodiment of the steering gear according to the disclosure, it can be provided that corresponding supporting surfaces are provided on both sides of the screw pinion shaft. The advantageous effect of a variable spring-loading can thus be achieved for both directions of rotation of the screw pinion shaft and therefore for both directions of the steering angle of the steered wheels of a motor vehicle which is produced as an auxiliary steering angle.

In a particularly structurally advantageous embodiment of a steering gear according to the disclosure, it can be provided that the supporting surfaces, or at least one of the supporting surfaces, extend parallel to the torsion web when the pinion shaft is not loaded by a torque. It is thus moreover possible to realize a rigidity of the spring-loading of the screw pinion shaft which increases approximately proportionately to an increase in the torque exerted on the screw pinion shaft.

It can likewise be provided that the supporting surfaces, or at least one of the supporting surfaces, has a progression which is angled or curved relative to the direction radial to the longitudinal axis of the screw pinion shaft. In the case of a curved configuration, it should furthermore be provided that the radius/radii of curvature is/are greater than the radius of curvature of that side of the torsion web which is provided for contacting the corresponding supporting surface, which radius of curvature is calculated, on the one hand, from the greatest distance between the corresponding supporting surface and the torsion web and, on the other, from the length of that portion of the torsion web which extends adjacent to the supporting surface when the pinion shaft is loaded by an operating torque, and in particular the maximum operating torque. It is thus particularly possible to achieve a non-proportional increase in the rigidity of the spring-loading of the screw pinion shaft depending on an increase in the torque exerted on the screw pinion shaft, whereby the advantageous effects can be even better adapted for eliminating undesired noise development on the one hand and for the most advantageous possible steering feel on the other.

The desired effect according to the disclosure is particularly great if, with regard to a load in its longitudinal direction, the screw pinion shaft is supported directly or indirectly on the housing exclusively by means of the swivel ring, as is the case in a preferred embodiment of the steering gear according to the disclosure, since an elastic deformation of the torsion web in this longitudinal direction of the screw pinion shaft, which can be used for the variable abutting of the torsion web against the supporting surface, can thus be particularly pronounced.

The disclosure furthermore relates to a power-assisted steering system having a steering system according to the disclosure and a motor vehicle having such a power-assisted steering system.

The indefinite article ("a") is to be understood as such and not as a quantifier, in particular in the claims and in the description explaining the claims in general. Components which are defined accordingly are to be understood such that they are present at least once and can be present more than once.

BRIEF DESCRIPTION OF THE DRAWINGS

The disclosure will be explained in more detail below with reference to an exemplary embodiment illustrated in the drawings. The drawings show.

DETAILED DESCRIPTION

FIGS. 1 to 5 show the essential components of an embodiment of a steering gear according to the disclosure for a power-assisted steering system of a motor vehicle. This comprises a housing 1, within which a gear wheel 2 and a screw pinion 3 meshing with the gear wheel 2 are mounted.

The screw pinion 3 and a screw pinion shaft 4 comprising the screw pinion 3 are integrally formed in the form of a worm.

Figure 1:
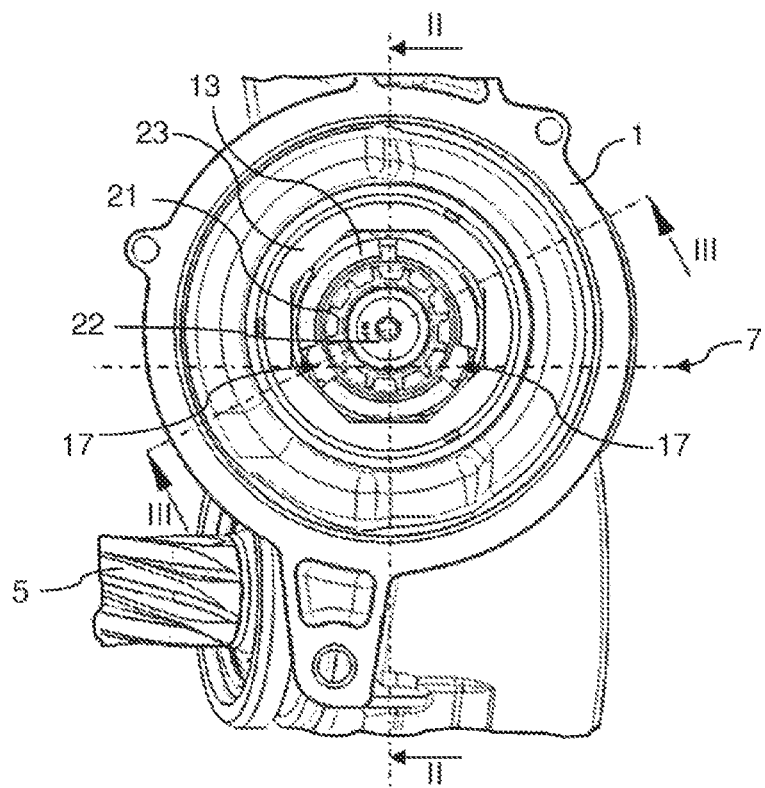
FIG. 1: a steering gear according to the disclosure in a side view.
Figure 2:
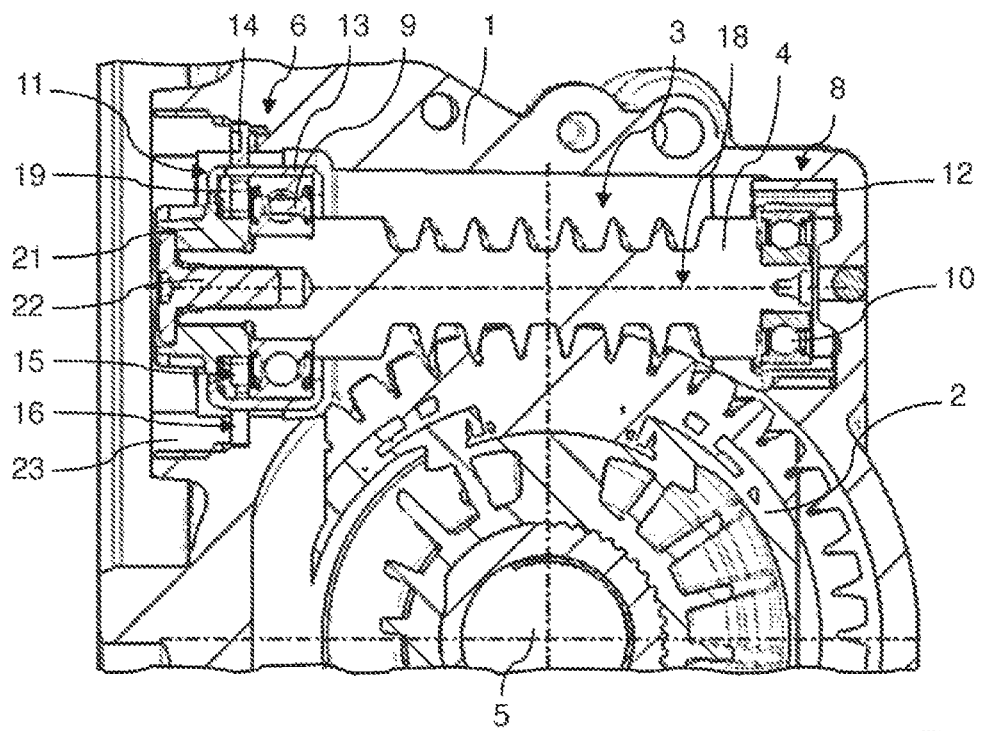
FIG. 2: a longitudinal section through the steering gear along the section plane II-II in FIG. 1.
Figure 3:
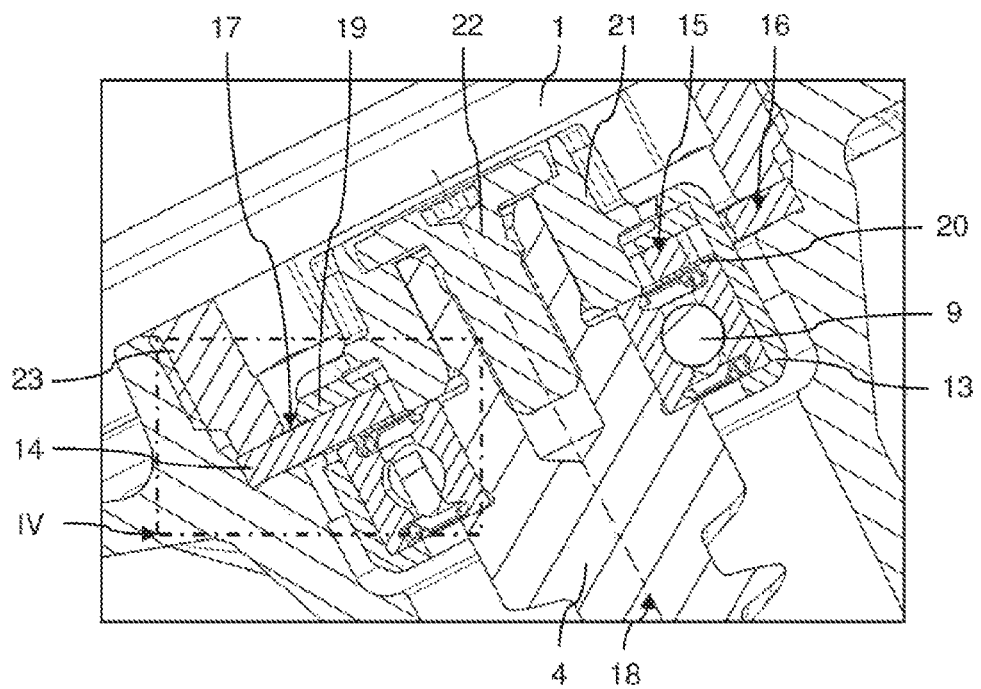
FIG. 3: a detail, illustrated on an enlarged scale, of a longitudinal section through the steering gear along the section plane III-III in FIG. 1.

The gear wheel 2 is fixedly fastened to an output shaft 5 (c.f. FIG. 1) of the steering gear. This output shaft 5, which has a gearing in the exemplary embodiment shown, can mesh for example with a steering rod formed as a gear rack in at least one portion, whereby this steering rod carries out a translatory movement which can be translated in a known manner into a swivel movement of steered wheels (not illustrated) of a motor vehicle (not illustrated). However, the output shaft 5 can also be a steering column of the power-assisted steering system, which is connected to a steering wheel and acts on the steering rod via a steering pinion.

Figure 5:
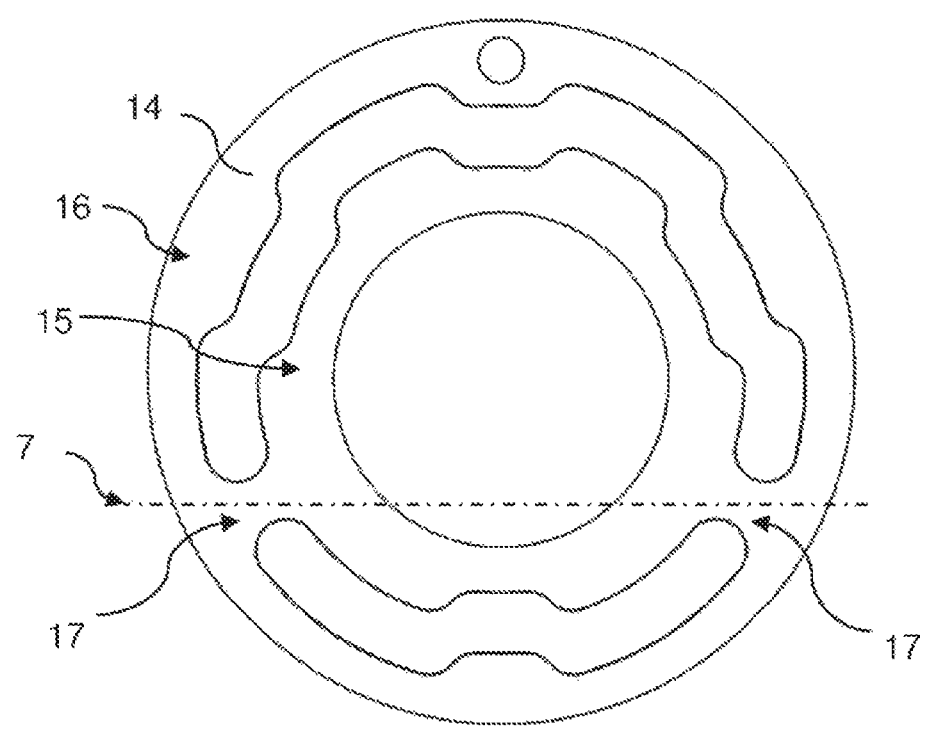
FIG. 5: a plan view of the swivel ring of the steering gear in an isolated illustration.

The screw pinion shaft has an end on the driving side via which it may be connected to the output shaft of a drive (e.g. an electric motor) which is not illustrated. In the region of this end on the driving side, the screw pinion shaft 4 is mounted in the housing 1 by means of a first bearing. This bearing is designed as a fixed bearing 6 which permits a swivel movement of the screw pinion shaft 4 about a swivel axis 7 (c. f. FIG. 1 and FIG. 5).

This swivel movement produces a deflection of the free end, opposite the end on the driving side, of the screw pinion shaft 4, which is mounted there in a corresponding receiving means of the housing 1 by means of a floating bearing 8. This floating bearing 8 is designed such that it permits the deflection of this free end, which is brought about by the swivel movement of the screw pinion shaft 4.

Both the fixed bearing 6 and the floating bearing 8 each comprise a pivot bearing in the form of a rolling bearing 9, 10, for example a ball bearing. The corresponding portions of the screw pinion shaft 4 are mounted in inner bearing shells of this rolling bearing 9, 10, whilst outer bearing shells of the rolling bearings 8, 9 are mounted in a respective bearing device 11, 12 which are in turn mounted in corresponding receiving means of the housing 1. The bearing devices 11, 12 are structurally designed such. that they enable the swivel movement of the screw pinion shaft 4 about the swivel axis 7 in the case of the fixed bearing 6 and the deflection of the free end of the screw pinion shaft 4 in the case of the floating bearing 8.

To this end, the bearing device 11 of the fixed bearing 6 comprises a bearing sleeve 13 which has a circular cross section and which internally receives the rolling bearing 9 in a first longitudinal portion and an inner ring 15 of a swivel ring 14 in a second longitudinal portion. The inner ring 15 of the swivel ring 14 is mounted within the bearing sleeve 13 in a torsion-resistant and axially secured manner with the interconnection of a supporting disk 19, wherein the inner ring 15 is supported on the outer bearing shell of the rolling bearing 9 with the interconnection of an intermediate disk 20. In addition to the inner ring 15, the swivel ring 14 comprises an outer ring 16. The outer ring 16 is connected to the inner ring 15 via two torsion webs 17 (c.f. FIGS. 1 and 3 to 5). To this end, the outer ring 16, the inner ring 15 and the torsion webs 17 are formed for example in one piece, e.g. from spring steel.

An axial positional securing of the rolling bearing 9 on the screw pinion shaft 4 takes place with the interconnection of a pressure piece 21 by means of a screw 22 which is screwed into an internal thread which is integrated in the corresponding end of the screw pinion shaft 4. An axial positional securing of the outer ring 16 of the swivel ring 14 within the housing 1 takes place by means of a screw ring 23, which has an external thread which is screwed into a corresponding internal thread of the housing 1.

The two torsion webs 17 form the swivel axis 7 about which the outer ring 16 is able to swivel. relative to the inner ring 15. In this case, however, the torsion webs 17 and therefore the swivel axis 7 do not extend through the center of the swivel ring 14, and therefore the cross section of the screw pinion shaft 4, but radially offset therefrom (c.f. FIG. 5). Therefore, the swivel axis 7 does not intersect the longitudinal axis 18 of the screw pinion shaft 4.

As a result of the radial offset of the torsion webs 17 from the center of the swivel ring 14, the swivel axis 7 is shifted into the vicinity of the outer circumference of the screw pinion shaft 4, whereby the generation of reaction moments, which are produced or would be produced as a result of the gearing forces produced during the engagement of the screw pinion 3 and the gear wheel 2 in conjunction with the spacing of the line of action of these gearing forces from the swivel axis 7, can be decreased or eliminated. To eliminate the reaction forces as completely as possible, it is provided that the swivel axis 7 is located within that tangential plane which is formed in the contact point of the two reference or pitch circles of the gear wheel 2 and the screw pinion 3.

The torsion webs 17 of the swivel ring 14 enable not only a swivel movement of the outer ring 16 with respect to the inner ring 15, and therefore the screw pinion shaft 4 relative to the gear wheel 2 or the housing 1, but, at the same time, produce the spring force by means of which the screw pinion 3 of the screw pinion shaft 4 is pressed into the gearing of the gear wheel 2 in order to achieve as little gear play as possible and therefore a correspondingly low noise development during the operation of the steering gear, in particular in the case of so-called alternating steering. This spring force arises from the fact that, during the assembly of the steering gear, the screw pinion shaft 4 is deflected as a result of a contact with the gear wheel 2 to the extent that sufficient torsion of the torsion webs 17 is produced so that the elastic restoring moments, which result from the torsion of the torsion webs 17, act in opposition to this deflection of the screw pinion shaft 4 and therefore load it against the gear wheel 2.

In this case, the rigidity of this spring-loading depends directly on the effective length of the torsion webs 17 since a swivel movement of the screw pinion shaft 4, and therefore the inner ring 15 of the swivel ring 14, through a defined angle (e.g. only 0.7°) relative to the outer ring 16 fixed in the housing 1 results in a twisting which increases with the decreasing length of torsion webs 7.

Figure 4:
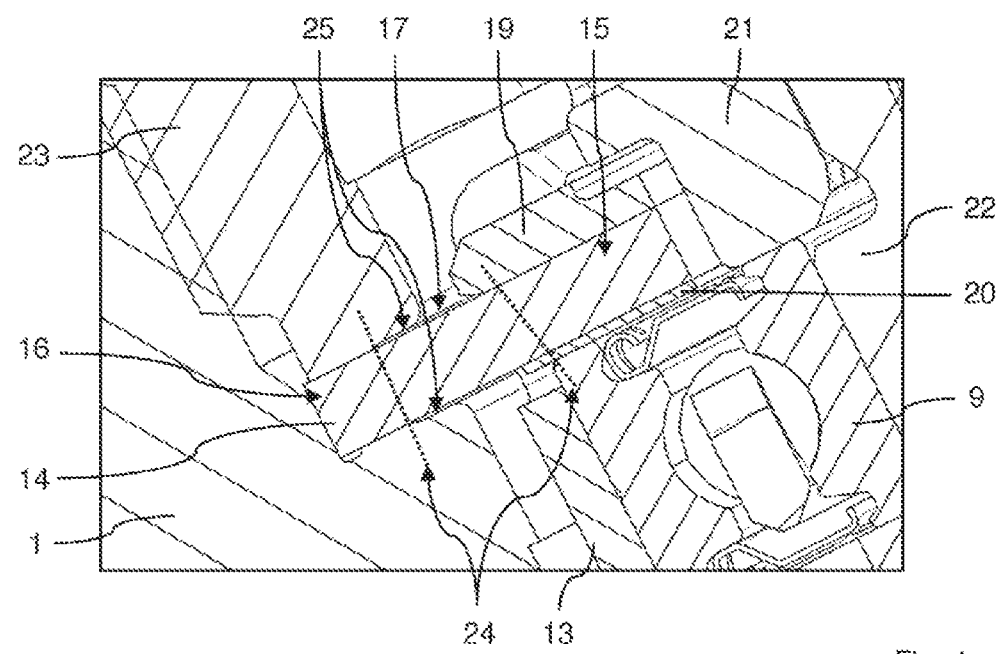
FIG. 4: the detail IV in FIG. 3 in an enlarged illustration.

The maximum effective length of the torsion webs 17 is produced by the spacing which is formed between the end at which the outer ring 16 is clamped between the corresponding portions of the housing 1 and the screw ring 23 on the one hand and the end at which the inner ring 15 is clamped between the supporting disk 19 and the intermediate disk 20 on the other, as is illustrated in FIG. 4 with the aid of the dotted boundary lines 24.

Both the contact surface of the housing 1, which is provided for contact with the outer ring 16 of the swivel ring 14, and the corresponding contact surface of the screw ring 23 continue a short distance from the associated boundary line 24 of the clamping formed thereby in the direction of the longitudinal axis of the screw pinion shaft 4 and therefore adjacent to the sides of the associated torsion web 17 which are spaced apart from one another relative to the longitudinal direction of the screw pinion shaft 4, wherein, as a result of a step formed in these contact surfaces, in the region of which the contact surfaces each form a supporting surface 25 according to the disclosure, a spacing is formed between these and the adjacent sides of the respective torsion web 17 so long as the screw pinion shaft 4 is not loaded or is only loaded by a relatively low torque. As a result of these spacings, which can be for example ca. 0.05 mm, the effective length of the torsion webs 17 corresponds to the maximum length and therefore the respective spacing between your two associated boundary lines 24. Owing to this relatively long effective length of the torsion webs 17, the rigidity of the spring-loading of the screw pinion shaft 4, which is produced geometrically from the deflection of the screw pinion 3 as a result of the contact with the gear wheel 2, is relatively low in this state of the steering gear.

On the other hand, if the screw pinion shaft 4 is loaded by a (relatively high) torque by means of the drive (not illustrated) connected thereto, this also results in the generation of forces acting in the longitudinal direction of the screw pinion shaft 4 as a result of the thread-shaped gearing of the screw pinion 3, which forces are supported on the housing 1 substantially exclusively via the swivel ring 14 since a connection between the screw pinion shaft 4 and the housing 1 in the region of the fixed bearing 6 is produced exclusively via the swivel ring 14, whilst the bearing device 12 of the floating bearing 8 is mounted to be movable within the housing 1 relative to the longitudinal direction of the screw pinion shaft 4. In this case, the direction of the forces acting in the longitudinal direction of the screw pinion shaft 4 is dependent on the direction of rotation in which the screw pinion shaft 4 is rotated by means of the drive and therefore depends on the direction the intended steering angle of the motor vehicle.

Owing to the deformability of the torsion webs 17 via which a longitudinal force acting on the screw pinion shaft 4 is transmitted to the housing 1, this results in a slight longitudinal movement of the screw pinion shaft 4 in the corresponding direction, which, depending on the extent of the torque acting on the screw pinion shaft 4 and therefore the longitudinal force produced by this torque, in a partial or complete abutting of those portions of the corresponding sides of the torsion webs 17 which are adjacent to the supporting surfaces 25 against the associated supporting surface 25, whereby the effective length of the torsion webs 17 which is available for the twisting as a result of the spring-loading of screw pinion shaft 4 decreases. With an unchanged deflection of the screw pinion shaft 4, a correspondingly greater twisting of the torsion webs 17, and therefore a relatively high rigidity of the spring-loading of the screw pinion shaft 4, results as a consequence of this smaller effective length of the torsion webs 17.

As a result, a relatively low spring-loading and therefore also friction in the gear pairing between the screw pinion 3 and the gear wheel 2 can therefore be achieved if the torque exerted on the screw pinion shaft 4 is zero or relatively low, as is also the case in particular when a motor vehicle comprising the steering gear is traveling. The relatively low friction achieved in this way not only results in a relatively high efficiency of the steering gear but, in particular, also in a pleasant steering feel.

On the other hand, if a relatively high auxiliary power has to be applied by the drive of the power-assisted steering system, as is the case in particular when steering in the stationary state and when the motor vehicle is being driven slowly, the torque exerted on the screw pinion shaft 4 is also correspondingly high, whereby, as a result of a partial abutting of the corresponding sides of the torsion webs 17 against the supporting surfaces 25, the effective length of the torsion webs 17 decreases, the twisting thereof thereby increases and a spring-loading is consequently realized with a relatively high rigidity which, although. it is linked to a corresponding increase in the friction in the gear pairing between the screw pinion 3 and the gear wheel 2, is generally not regarded as a problem. However, at the same time, a gear play and a resultant noise development, which is perceived as disadvantageous, is instead effectively eliminated or reduced to a corresponding extent.

To further reinforce the effect of a change in the effective lengths of the torsion webs 17 depending on the torque applied to the screw pinion shaft 4, corresponding supporting surfaces 25 can be provided not only in the region in which the outer ring 16 of the swivel ring 14 is clamped, but likewise in the region in which the inner ring 15 of the swivel ring 14 is clamped. In this case, the supporting surfaces 25 in the region in which the inner ring 15 is clamped can be designed to correspond with those in the region in which the outer ring 16 is clamped and therefore extend, for example, at a substantially constant spacing from, and therefore parallel to, the associated portions of the corresponding sides of the torsion webs 17 so long as the screw pinion shaft 4 is not loaded by a torque.

On the other hand, an alternative configuration for the supporting surface 25, which are moreover provided on only one side of the individual torsion webs 17, is illustrated in the drawings. In the unloaded state of the screw pinion shaft 4, this supporting surface extends at an angle relative to the corresponding sides of the torsion webs 17 and can moreover have a curved progression, wherein the radius of curvature which is then formed by this is preferably considerably greater than the radius of curvature of the associated torsion web 17, which is calculated from the greatest distance a between the corresponding supporting surface 25 and the torsion web 17 and the length b of the portion of the torsion web 17 which extends adjacent to this supporting surface 25 when the pinion shaft 4 is loaded by the highest operating torque provided. It can thus he achieved that the effective length of the individual torsion webs 17 does not decrease approximately proportionately to an increase in the torque acting on the screw pinion shaft 4.

A further positive effect which results from the decrease in the effective length of the torsion webs 17 with an increase in the torque acting on the screw pinion shaft 4 consists in an improved durability of the torsion webs 17 which, as mentioned, is substantially exclusively responsible for supporting the longitudinal forces resulting from a torque acting on the screw pinion shaft 4 since, with a decreased effective length, the deflection of the torsion webs 17 in the longitudinal direction of the screw pinion shaft 4 is also decreased, which has an advantageous effect in particular owing to the alternating load with which the torsion webs 17 are loaded.

LIST OF REFERENCE SIGNS

1 Housing
  2 Gear wheel
  3 Screw pinion
  4 Screw pinion shaft
  5 Output shaft
  6 Fixed bearing
  7 Swivel axis
  8 Floating bearing
  9 Rolling bearing of the fixed bearing
  10 Rolling bearing of the floating bearing
  11 Bearing device of the fixed bearing
  12 Bearing device of the floating bearing
  13 Bearing sleeve
  14 Swivel ring 15 inner ring of the swivel ring
16 Outer ring of the swivel ring
17 Torsion web
18 Longitudinal axis of the screw pinion shaft/of the bearing sleeve
19 Supporting disk
20 Intermediate disk
21 Pressure piece
22 Screw
23 Screw ring
24 Boundary lines of the torsion webs
25 Supporting surface

The invention claimed is:

1. A steering gear, comprising:
a gear wheel,
a screw pinion that meshes with the gear wheel, and
a screw pinion shaft that includes the screw pinion, the screw pinion shaft mounted in a fixed bearing on one side of the screw pinion,
wherein the fixed bearing comprises a pivot bearing with an inner bearing shell and an outer bearing shell, the inner bearing shell configured to receive the screw pinion shaft, the outer bearing shell configured to be connected to an inner ring of a swivel ring,
wherein the inner ring is connected to an outer ring of the swivel ring via at least one torsion web so as to swivel about a swivel axis lying transversely to the longitudinal direction of the screw pinion shaft, the outer ring configured to be mounted in a housing of the steering gear,
wherein the torsion web extends at a spacing from a supporting surface on at least one side relative to the longitudinal direction of the screw pinion shaft, the spacing dimensioned such that the torsion web (i) does not contact the supporting surface when the screw pinion shaft is not loaded by a torque and (ii) at least partially contacts the supporting surface when the screw pinion shaft is loaded by an operating torque.

2. The steering gear as claimed in claim 1, wherein corresponding supporting surfaces are provided on both sides of the torsion web.

3. The steering gear as claimed in claim 1, wherein the supporting surface extends parallel to the torsion web when the screw pinion shaft is not loaded by a torque.

4. The steering gear as claimed in claim 1, wherein the supporting surface has a progression which is curved or angled relative to the direction radial to the longitudinal axis of the screw pinion shaft.

5. The steering gear as claimed in claim 4, wherein the radius of curvature is greater than the radius of curvature of that side of the torsion web which is provided for contacting the supporting surface, which radius of curvature is calculated from the greatest distance between the supporting surface and the torsion web and the length of the portion of the torsion web which extends adjacent to the supporting surface when the screw pinion shaft is loaded by an operating torque.

6. The steering gear as claimed in claim 1, wherein, with regard to a load in its longitudinal direction, the screw pinion shaft is supported directly or indirectly on the housing exclusively by the swivel ring.

7. The steering gear as claimed in claim 2, wherein the supporting surfaces extend parallel to the torsion web when the screw pinion shaft is not loaded by a torque.

8. The steering gear as claimed in claim 2, wherein the supporting surfaces have a progression which is curved or angled relative to the direction radial to the longitudinal axis of the screw pinion shaft.

9. The steering gear as claimed in claim 8, wherein the radii of curvature are greater than the radius of curvature of that side of the torsion web which is configured to contact the corresponding supporting surface, which radius of curvature is calculated from the greatest distance between the corresponding supporting surface and the torsion web and the length of the portion of the torsion web which extends adjacent to the supporting surface when the screw pinion shaft is loaded by an operating torque.

* * * * *